United States Patent [19]

Blount

[11] Patent Number: 4,695,595

[45] Date of Patent: Sep. 22, 1987

[54] PROCESS FOR THE PRODUCTION OF CELLULAR ORGANIC SILICATE PRODUCTS

[76] Inventor: David H. Blount, 6728 Del Cerro Blvd., San Diego, Calif. 92120

[21] Appl. No.: 443

[22] Filed: Jan. 5, 1987

Related U.S. Application Data

[62] Division of Ser. No. 892,834, Aug. 4, 1986, Pat. No. 4,663,363.

[51] Int. Cl.$^4$ ............................................. C08J 9/00
[52] U.S. Cl. ................................... 521/99; 521/120; 521/114; 521/131; 521/154
[58] Field of Search ................. 521/99, 120, 114, 131, 521/154

[56] References Cited

U.S. PATENT DOCUMENTS

| | | | |
|---|---|---|---|
| 4,357,460 | 11/1982 | Blount | 521/154 |
| 4,357,463 | 11/1982 | Blount | 521/154 |
| 4,663,363 | 5/1987 | Blount | 521/154 |

*Primary Examiner*—Morton Foelak

[57] ABSTRACT

Foamed organic silicate produced by chemically reacting an alkali oxidated silicon compound with a substituted organic compound in the presence of a peroxide compound. This self-standing cellular organic silicate product may be utilized for thermal and sound insulation, as a cavity filler and as a coating agent.

10 Claims, No Drawings

PROCESS FOR THE PRODUCTION OF CELLULAR ORGANIC SILICATE PRODUCTS

CROSS-REFERENCE TO RELATED APPLICATION

This is a divisional of U.S. patent application Ser. No. 06/892,834, filed Aug. 4, 1986, now U.S. Pat. No. 4,663,363.

BACKGROUND OF THE INVENTION

This invention relates to the production of cellular organic silicate products produced by the chemical reaction of an alkali oxidated silicon compound, a substituted organic compound and a peroxide compound. The product produced by this invention will be referred to as a cellular organic silicate product.

Epoxy foam products were produced by the process found in U.S. patent application Ser. No. 06/892,834, filed by David H. Blount, M.D., solid organic alkali metal silicate compound by the process illustrated in U.S. Pat. Nos. 4,303,768; 4,321,184; 4,3332,578; 4,332,926; 4,346,180; 4,346,192 and 4,361,696. The epihalohydrin used in U.S. patent application No. 06/892,834 will not be used in this invention. In the process of this invention, the foam is produced by the release of oxygen from the peroxide which also oxidizes the oxidated silicon compound and initiates the reaction between the substituted compound and the alkali oxidated silicon compound.

DESCRIPTION OF THE INVENTION

Organic silicate cellular products are produced by the chemical reaction of an alkali oxidated silicon compound, a substituted organic compound and a free-radical initiator, e.g., organic and inorganic peroxides.

The reactants may be mixed in any suitable proportions, depending upon the product characteristic desired. The reactants may be added in any suitable method such as mixing all reactants simultaneously or mixing the alkali oxidated silicon compound and the substituted organic compound, then adding the peroxide compound or mixing the alkali oxidated silicon compound and the peroxide, then adding the substituted organic compound. The reactions of the invention may take place under any suitable physical condition. While many of the reactions will take place acceptably at ambient temperature and pressure, preferably, the reaction takes place at a temperature between 20° C. and 100° C. On the other hand, where the reaction is exothermic, it may be desirable to cool the reaction vessel.

The preferred process of this invention is to add the reactants simultaneously and thoroughly mix at ambient temperature and pressure. The reaction is exothermic and, in large volumes, it will be necessary to cool the reaction vessel.

The exact course of the reactions which take place during the process to produce cellular organic silicate products cannot be determined with 100 percent certainty. The exact chemical formula for the organic silicate products is not known. The peroxide compound enhances the reaction of the substituted with the alkali oxidated compound by oxidizing the alkali oxidized silicon compound and initiating the reaction of the organic radical and the substituted radical with the alkali oxidated silicon compound.

A good cellular organic silicate product can be produced without reacting all the alkali radicals of the alkali oxidated silicon compound with the substituted radicals of the organic compound. It is preferable to remove sufficient alkali radicals from the alkali oxidated silicon compound to make the organic silicate product not soluble in water.

Cellular organic silicate products are produced by mixing and reacting the following components:
A. substituted organic compounds;
B. alkali oxidated silicon compound;
C. free-radical initiator.

COMPONENT A

Any suitable organic compound which is attached to a substituent which will split off during the reaction may be used in this invention. A suitable organic compound may contain one or more substituents and may be saturated or unsaturated hydrocarbon. An organic compound is preferred, having a substituent which splits off during the reaction. These substituted organic compounds have the graphical skeleton carbon structure of

where X represents the substituents which split off during the reaction. The R, R' and R" are selected from the following groups: hydrogen, saturated straight-chain carbon atoms, unsaturated carbon atoms, ether linkages, ester linkages, aromatic structures, another X and others, for it is to be understood that other structures may be employed, and mixtures thereof. The X substituent can be halogen, acid sulfate, nitrate, acid phosphate, bicarbonate, sulfate, formate, acetate, propionate, laurate, oleate, stearate, acid oxalate, acid malonate, acid tartrate, acid citrate, mixtures thereof and others.

Suitable substituted organic compounds include, but are not limited to, substituted alkyl compounds such as methyl halides, e.g., methyl chloride, methyl bromide, methyl iodide, etc., methyl sulfate, methyl hydrogen sulfate, methyl hydrogen phosphate, methyl nitrate, ethyl halides such as ethyl chloride, ethyl bromide, ethyl iodide, etc., ethyl hydrogen sulfate, ethyl sulfate, ethyl hydrogen phosphate, ethyl nitrate, ethyl oxalate, propyl halides, propyl hydrogen sulfate, 1-nitropropane, 2-nitropropane, propyl hydrogen phosphate, butyl halides, butyl hydrogen sulfate, 2-nitro-1-butanol, butyl hydrogen phosphate, etc., substituted unsaturated compounds such as vinyl chloride, vinyl bromide, vinyl acetate, vinyl lidene chloride, substituted carboxylic acids, such as chloroacetic acid, dichloroacetic acid, sodium chloroacetate, bromoacetic acid, iodoacetic acid, γ-chloropropionic acid, γ-chlorobutyric acid, etc.; acid chlorides such as acetyl chloride, acetyl bromide, propionyl chloride, n-butyryl chloride chloroacetic chloride, etc.; carboxyl acid anhydrides such as acetic anhydride, propionic anhydride, n-butyric anhydride, isobutyric anhydride, etc.; organic esters such as ethyl acetate, methyl propionate, propyl formate, methyl formate, ethyl formate, methyl acetate, n-butyl acetate, ethyl chloroacetate, etc.; substituted benzene compounds such as benzyl chloride, nitrobenzene, and p-chlorobenzoic acid, etc.

Polysubstituted organic compounds which are used in this invention to produce cellular organic silicate have e graphical skeleton carbon structure of

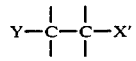

where

represents two adjacent carbon atoms, or

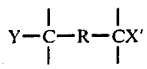

where Y and X' represent the substituents which split off during the reaction. The R between the pair of reactive carbon atoms is selected from the following groups: saturated straight-chain carbon atoms, unsaturated carbon atoms, ether linkages, ester linkages, aromatic structures, and others, for it is to be understood that other intervening structures may be employed, and mixtures thereof. The X and X' substituents can be halogen, acid sulfate, nitrate, acid phosphate, bicarbonate, formate, acetate, propionate, laurate, oleate, stearate, oxalate, acid malonate, acid tartrate, acid citrate and others, and mixtures thereof. Examples of these organic compounds include, but are not limited to:

| | |
|---|---|
| A. $CH_3CHXOCHX'CH_3$ | AA' disubstituted ethyl ether; |
| $XC_2H_4OC_2H_4X'$ | BB' disubstituted ethyl ether; |
| $XCH_2OCH_2X'$ | Disubstituted methyl ether; |
| $XC_2H_4OC_2H_4OC_2H_4X'$ | Disubstituted ethoxy ethyl ether; |
| $XCH_2CH_2SCH_2CH_2X'$ | Disubstituted thio ethyl ether; |
| 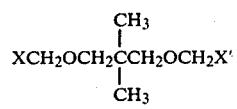 | Disubstituted 1,3-Methoxy-2,2-dimethyl propane; |
| $XCH_2CH_2CH_2OCH_2OCH_2CH_2CH_2X'$ | Disubstituted dipropyl formal; |
| | Disubstituted paradiethoxy benzene; |
|  | |
| $XCH_2OCH_2CHOCH_3$ | Disubstituted dimethoxy ethane; |
|  | Disubstituted diethyl carbonate; |
| 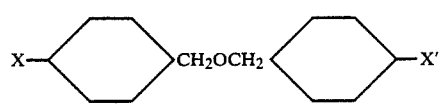 | Disubstituted glycol diacetate; |
| | pp' disubstituted diphenyl sulphone; |
| 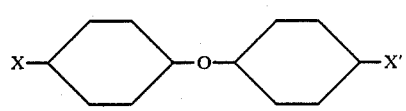 | |
| | pp' disubstituted diphenyl ether; |
| 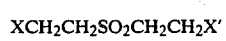 | |
| $XCH_2CH_2SO_2CH_2CH_2X'$ | Disubstituted diethyl sulphone; |
| 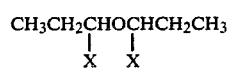 | AA' disubstituted propyl ether; |
| | Para disubstituted benzene; |
| 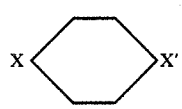 | |
| | Disubstituted para xylene. |
|  | |

-continued

B. 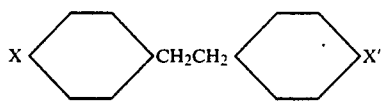 pp' disubstituted dibenzyl;

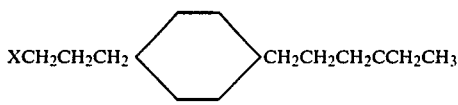 Disubstituted para hexyl propyl benzene;

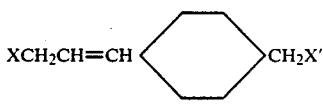 Disubstituted 3 toyl propene 2;

and others such as methylene chloride or bromide, ethylene dichloride, ethylene dibromide, propylene dichloride or dibromide, dihalides of unsaturated hydrocarbon gases derived from pressure-cracking processes and natural gas-cracking processes as well as compounds having more than two substituents such as 1,1,2-trichloroethane; 1,2,4-trichlorobutane; trichloromssitylene and the like, cellulose acetate. nitrocellulose, cellulose acetate butyrate, cellulose propionate, cellulose acetate phthlate, polyvinyl acetate emulsion and mixtures thereof.

COMPONENT B

Any suitable alkali oxidized silicon compound may be used in this invention such as alkali metal silicates, alkaline earth metal silicates, zeolites and water-binding silicates, compounds which contain an alkali metal or alkaline earth metal radical and mixtures thereof.

Suitable alkali metal silicates include sodium silicate, potassium silicate, lithium silicate and mixtures thereof. Sodium silicate is the preferred alkali metal silicate.

Suitable alkaline earth metal silicates include calcium silicate. The preferred form of calcium silicate is the synthetic calcium silicate.

Suitable water-binding silicate compounds which contain an alkali metal or alkaline earth metal radical, including any mixture of fine-ground lime, alumina and silica that will set to a hard product by the admixture of water, which combines chemically with the other ingredients to form a hydrate, may be used. Suitable water-binding silicates include hydraulic cements such as Portland cement, quick-setting cement, blast-furnace Portland cement, mild burnt cement, sulphate-resistant cement, brick cement, natural cement, lime cement, gypsum cement, and pozzolano cement, and mixtures thereof.

The preferred alkali oxidated silicon compound is sodium silicate. Sodium silicate may be utilized in the in the form of a powder or in an aqueous solution. The $SiO_2:NaO$ ratio may be quite varied, but is preferred to range from 4.0:1 to 1:1. The sodium silicate solution may contain silica sol, colloidal silica and mixtures thereof.

COMPONENT C

Any suitable free-radical initiator may be used which will promote the chemical reaction of an alkali oxidated silicon compound with a substituted organic compound and also promotes the reaction of oxidated silicon radicals with other oxidated silicon radicals. Suitable free-radical initiators are inorganic and organic peroxides, alkali metal persulfates and mixtures thereof. The free-radical initiator can be modified by activators and promoters. Initiators are strong oxidizing agents and promoters that usually are strong reducing agents. Redox systems may also be utilized in this invention. The activators and promoters vary with each free-radical initiator and are well known in the chemical arts. The organic peroxides are well known in the chemical arts.

The preferred free-radical initiator is hydrogen peroxide. The aqueous solution of hydrogen peroxide is preferred.

Any suitable organic or inorganic compound that will react chemically with alkali oxidated silicon compound or the substituted organic compound may be used to modify the organic silicate products. Compounds which are polymerized by free-radical initiators may be used to modify the organic silicate products.

Any suitable modifying or additive compounds may be used in the reaction of this invention to vary properties of the product. Typical modifying compounds include polyols, polyepoxides, polysulfide polymers, alkali sulfides, sodium polysulfides, aminoplasts, phenoplasts, fatty or rosin acids, furfural-ketone resins, styrene oxides, carbon disulfide, sulfur, wood flour, wood fibers, cellulose, lignin, polyester polymers, polyether polymers, vegetable oil, melamine, furan compounds, vinyl monomers and polymers, aliphatic dienes, halogenated aliphatic and aromatic compounds, triallyl cyanurate, polyepichlorohydrin polymers, alkali metal phenols, alkali metal salts of dicarboxyl acids, alkali metal polyhydroxy aliphatic and aromatic compounds, alkali metal salts of poly(acrylic acid) polymers and poly(methacrylic acid) polymer, aldehydes and mixtures thereof.

Suitable polyols are, but are not limited to, polyhydroxyl compounds of polyesters, polyethers, polythioesters, polyacetals, polycarbonates, polyamides or polybutadiene; castor oil, carbohydrates, starches, additional products of alkaline oxides with phenoformaldehyde resins or urea-formaldehyde resins, di(mono hydroxy) alkane, glycerol, Bisphenol A, diglycidyl ether of bisphenol, resorcinol, hydroquinoneglycols, polyvinyl alcohol and mixtures thereof.

Various additives, fillers, organic and inorganic foam stabilizers, emulsifiers, flame-retarding agents, plasticizers, stabilizers against aging and weathering, fungicidal and bacteriocidal substances, dyes, cell regulators, and blowing agents may be added to the epihalohydrin, alkali oxidated silicon compound and free-radical initiator mixture.

Additives may be added to emulsify the mixture, to modify the cells in the cellular solid, to regulate the foaming and to stabilize the cellular solid. The mixture may be emulsified with alkali soaps, metallic soaps such as zinc stearate and calcium stearates and detergents. The cells in the cellular solid may be modified, regulated and stabilized by the addition of additives such as metallic powders, ethyl cellulose, chlorinated natural rubber, polyvinyl acetate, polyvinyl chlorides, metallic salts, metallic oxides and hydroxides, alkylated phenoxy compounds, polyethoxy ethanol, sodium dioctyl sulfosuccinate, dioctyl calcium sulfosuccinate, dioctyl sulfosuccinate, methyl morpholine, diethylethanolamine, polyether siloxanes, and mixtures thereof.

Water-binding agents which do not contain silicate, e.g., calcium aluminate, may be used to react with any excess water present.

Any suitable polyepoxy compound may be used in this invention.

Suitable polyepoxy compounds include, but are not limited to, epoxidized polyhydroxy compounds, epoxidized oils, epoxidized unsaturated organic compounds, epoxidized unsaturated fatty acids, phenoxy resins, polyepoxy resin produced by reacting epichlorohydrin with Bisphenol A[(2,2-(4-bishydroxy phenol)-propane]; diglycidil ether of bisphenol; 1,2-epoxy butane; 1,2 epoxycyclohexane; 1,2-epoxypropane; 1-chloro 2,3 epoxypropane; and mixtures thereof.

Any suitable organic compound that will slowly react with the alkali radical of the alkali oxidated silicon compound to form a salt with any excess alkali radical present in the reactive mixture of this invention may be used.

Suitable compounds such as silicic acid, polysylic acid, metal salts, amorphous silica, colloidal silica, boric acid, weak organic acids, etc., may be used in this invention.

Various reinforcing agents may be used in this invention. The inorganic and/or organic reinforcing elements may be, e.g., fibers, metal wires, foams, fabrics, fleeces or skeletons. The reinforcing elements may be mixed with the reaction mixture, for example, by the fibrous web impregnation or by processes in which the reaction mixtures and reinforcing fibers are together applied to the molds, for example, by means of a spray apparatus. The shaped products obtained in this way may be used as building elements, e.g., in the form of sandwich elements, either as such or after they have been laminated with metal, glass, plastics, wood or concrete. If desired, these sandwich elements may be foamed. These products may be used as hollow bodies, e.g., as containers for goods which may be required to be moist or cool, as filter materials or exchanges, as catalyst carriers or as carriers of active substances, as decorative elements, furniture components and filling for cavities. They may be used in the field of model building and mold building, and in the production of molds for metal casting, which may also be considered Fillers in the form of powders, granules, wire, fibers, dumbbell-shaped particles, crystalites, spirals, rods, beads, hollow beads, foam particles, non-woven webs, pieces of woven or knitted fabrics, tapes and pieces of foil or solid inorganic or organic substances, e.g., dolomite, chalk, alumina, asbestos, basic silicic acids, sand, talc, iron oxide, aluminum oxide and hydroxide, calcium sulfates, alumino silicates, basalt wool or powder, glass fibers, carbon fibers, graphite, carbon black, Al, Fe, Cu and Ag powders, molybdenum sulfide, steel wool, bronze or copper meshes, silicon powder, expanded clay particles, hollow glass beads, glass powder, lava and pumice particles, wood chips, wood meal, cork, cotton, straw, popcorn, coke or particles of filled or unfilled, foamed or unfoamed, stretched or unstretched organic polymers, may be added to the mixture of the components in many applications. Among the numerous. organic polymers which may be used, e.g., as powders, granules, foam particles, beads, hollow beads, foamable but not-yet-foamed particles, fibers, tapes, woven fabrics or fleeces, the following may be mentioned as examples: polystyrene, polyethylene, polypropylene, polyacrylonitrite, polybutadiene, polyisoprene, polytetrafluoroethylene, aliphatic and aromatic polyesters, melamine, phenoplasts, aminoplasts, polyacetal resins, polyepoxides, polyhydantoins, polyethers, polyurethane, polyimides, polyamides, polysulphones, polycarbon ates and mixtures thereof.

The composite materials of the invention may be mixed with considerable quantities of fillers without losing their advantageous properties and, in particular, composite materials which consist predominantly of organic constituents which are, preferably, filled with inorganic fillers, where silicate constituents predominate, it is preferably filled with organic fillers.

Blowing agents may be used in this invention. The blowing agents are usually inert liquids with boiling points ranging from $-25°$ C. to $80°$ C. The organic blowing agents may be, e.g., acetone, echyl acetate, halogenated alkanes, e.g., methylene chloride, monofluorotrichloromethane, dichlorodifluoromethane, butane, hexane, heptane or diethylether. There are compounds which decompose at temperatures above room temperature with liberation of, e.g., nitrogen. Compressed air may also be used as the blowing agent.

The reaction mixture of this invention may be used as a solid product by allowing any gas produced by the free-radical initiator to escape from the mixture before the reaction mixture solidifies. The fluid reactive mixture, with the gas removed by stirring, vacuum, may be poured or sprayed or infected into a mold. Subsequently, the mixture hardens. Reinforcing agents and filler may be quite easily incorporated into the reaction mixture. These products may be used as cavity fillers, building panels, building bricks, grout, mortor, and in many cases, can be used in place of wood or hard fiber boards, as art objects, moldings, decorating elements, furniture components, surface coating, adhesive bonds, putties, etc.

The ratio of the essential reactants and optional reactants which lead to the organic silicate foamed product of this invention may vary, broadly speaking, with ranges as follows:

(a) 1 to 100 parts by weight of Component A (substituted organic compound;
(b) 100 parts by weight of Component B (alkali oxidated silicon compounds);
(c) 1 to 10 parts by weight of Component C (free-radical initiator);
(d) up to 300% by weight of water, based on the weight of Components A, B and C;
(e) up to 20% by weight of a foam stabilizer, based on weight of Components A, B and C;
(f) up to 50% by weight of a chemically inert blowing agent, boiling within the range of from $-25°$ C. to 80° C., based on the weight of Components A, B and C;
(g) up to 10% by weight of an emulsifier, based on weight of Components A, B and C;
(h) up to 300% by weight of an inert filler material, based on the weight of Components A, B and C;
(i) up to 300% by weight of modifying compounds, based on the weight of Component A;
(j) up to 10% by weight of a promoter of the free-radical initiator, based on weight of Component C;
(k) up to 10% by weight of an activator for the free-radical initiator, based on weight of Component C.

The novel cellular products produced by this invention have many uses. The reaction mixtures, with or without a blowing agent, may be mixed in a mixing apparatus; then the reaction mixture (alkali oxidated silicon compound, substituted organic compound and free-radical initiator) may be sprayed by means of compressed air or the airless spraying process onto surfaces. Subsequently, the mixture expands and hardens in the form of a cellular solid which is useful for insulation, cavity filling and coating. The reaction mixture may also be forced, poured or injected into cold or heated molds, optionally by centrifugal casting, and left to harden at room temperature or at temperatures up to 100° C., optionally under pressure. Reinforcing elements may quite easily be incorporated into the reaction mixtures. These products may also be used as cavity fillings, packaging materials, building materials, e.g., light-weight building bricks and panels, having a good solvent resistance, advantageous fire-resistant characteristics, good strength, high dimensional stability to heat and cold, and good sound-absorption capacity. The cellular products of this invention may be foamed on the building site, using any hollow forms for foaming. The foams may be crushed and used for propagation of seedlings, cuttings and plants or cut flowers after washing out any salt.

The object of the present invention is to provide a novel process to produce organic silicate solid or cellular solid products. Another object is to produce novel solid and cellular organic silicate products. Another object is to produce novel cellular and solid organic silicates which are relatively low in cost. Still another object is to produce novel fine cellular products which are relatively low in cost, are rigid, light-weight, high-strength, fire-resistant, with good resistance and dimentional stability when heated, and are solvent-resistant.

Another object is to produce solid or cellular products which may be used for thermal or sound insulation structural purposes, shock-resistant packaging, as a coating agent, an adhesive, casting material, cavity fillers, mortor, etc.

The reaction mixture of this invention may be used as a solid product by allowing any gas produced by the free-radical initiator to escape from the mixture before the reaction mixture solidifies. The fluid reactive mixture, with the gas removed by stirring vacuum, may be poured or sprayed or injected into a mold. Subsequently, the mixture hardens. Reinforcing agents and filler may quite easily be incorporated into the reaction mixture. These products may be used as cavity fillers, building panels, building bricks, grout, mortor, and, in many cases, can be used in place of wood or hard fiber boards, as art objects, moldings, decorating elements, furniture components, surface coating, adhesive bonds, putties, etc.

DESCRIPTION OF PREFERRED EMBODIMENTS

My invention will be illustrated in greater detail by the specific Examples which follow, it being understood that these preferred embodiments are illustrative of, but not limited to, procedures which may be used in the production of cellular organic silicate products. Parts and percentages are by weight unless otherwise indicated.

EXAMPLE 1

5 parts by weight of cellulose acetate, 30 parts by weight of an aqueous sodium silicate containing about 40% sodium silicate ($SiO_2$:NaO ratio of 3.2:1) and 2 parts by weight of an aqueous solution containing 35% hydrogen peroxide are mixed at ambient temperature and pressure, then poured into a container. The mixture slowly thickens in 10 to 30 minutes. Then the mixture begins to expand. The mixture solidifies within 30 to 40 minutes to produce a rigid, strong cellular solid product. The product has a combination of open and closed cells. The mixture expands to about 3 to 4 times its original volume. The foam is air-dried to remove excess water.

EXAMPLE 2

2 parts by weight of cellulose acetate, 20 parts by weight of an aqueous sodium silicate solutioncontaining about 40% sodium silicate ($SiO_2$:NaO ratio of 3.22:1), 1 part by weight of an aqueous solution containing 35% hydrogen peroxide, 0.5 part by weight of doctyl sodium sulfosuccinate and 0.25 parts by weight of polyether siloxane foam regulator are thoroughly mixed, then poured into a container. The mixture slowly thickens over a 10-to-20-minute period, then slowly expands to about three times its original volume, then solidifies into a tough, fine-celled rigid cellular solid product. The cellular product is air-dried and is a strong, light-weight foamed product. A dry, one-inch cube will withstand more than 200 pounds of weight without compressing.

EXAMPLE 3

About 100 parts by weight of an aqueous sodium silicate solution containing about 40% sodium silicate (819% $Na_2O$ and 28.7%$SiO_3$) and 25 parts by weight of sodium hydroxide are mixed and chemically reacted, then 25 parts by weight of methylene chloride and 5 parts by weight of an aqueous solution containing 35% hydrogen peroxide are added at ambient temperature and pressure while agitating. The mixture slowly thickens and expands to 3 to 4 times its original volume, then solidifies into a rigid cellular solid product. The cellular product is air-dried into a strong, light-weight foamed product.

EXAMPLE 4

Example 3 is modified wherein a halogenated substituted organic compound is selected from the list below and used in place of methylene chloride.
(a) ethylene chloride;
(b) ethylene dichloride;
(c) Benzene chloride;
(d) chloroform;
(e) bis(2-chloroethyl) ether;
(f) propylene dichloride;
(g) ethylene dibromide;
(h) propylene dibromide;

(i) ethylene chlorohydrin;
(j) dichloroacetic acid;
(k) 1-chloro-2-propanol.

EXAMPLE 5

Example 1 is modified wherein a substituted organic compound is selected from the list below and used in place of cellulose acetate.
(a) ethyl acetate;
(b) methyl acetate;
(c) propyl acetate;
(d) propane 1-dihydrogen phosphate;
(e) nitrobenzene;
(f) methyl sulfate;
(g) ethyl oxalate;
(h) 1,1-bromopropane;
(i) ethyl sulfate;
(j) ethyl hydrogen sulfate;
(k) p-chlorobenzyl;
(l) nitrocellulose;
(m) cellulose propionate;
(n) octetate phthalate;
(o) mixtures of the above.

EXAMPLE 6

About 100 parts be weight of an aqueous sodium silicate solution containing about 30% sodium silicate (18% $Na_2O$ and 36% $SiO_2$), 3 parts by weight of sodium salt of fatty acids and 20 parts by weight of sodium hydroxide are mixed and reacted in an autoclave, then methyl chloride, in an amount wherein the chlorine atoms about equal to the sodium atoms in the sodium hydroxide and about 5 parts by weight of an aqueous solution containing about 35% hydrogen peroxide are slowly added at 1000 to 1500 psi while agitating at 150° C. to 200° C. for 1 to 12 hours; then the pressure is slowly reduced to ambient pressure and the mixture expands to produce a cellular solid product.

EXAMPLE 7

About 100 parts by weight of an aqueous sodium silicate containing about 35% sodium silicate (18% $NaO_2$ and 36% $SiO_2$), 20 parts by weight of ethyl acetate and 10 parts by weight of an aqueous solution, containing 35% hydrogen peroxide, are thoroughly mixed at ambient temperature and pressure, then agitated until the mixture thickens. The mixture slowly expands, then solidifies into a rigid cellular solid.

Other substituted compounds may be used in place of ethyl acetate such as methyl acetate, propyl acetate, propane 1-dihydrogen phosphate, bis monochloroacetic acid, nitrobenzene, 1-chloro-2'-propanol, methyl sulfate, ethyl oxalate, 1,1-bromopropane, ethyl sulfate, 1-bromo-2'-butene, ethylene chlorohydrin, ethyl hydrogen sulfate, dichloroacetic acid, p-chlorobenzyl and mixtures thereof.

EXAMPLE 8

About 100 parts by weight of an aqueous sodium silicate solution, containing about 40% sodium silicate (14.7% $Na_2O$ and 29.4% $SiO_2$), 5 parts by weight of ethylene dichloride and 5 parts by weight of benzyl chloride, and 10 parts by weight of an aqueous solution containing 35% hydrogen peroxide are mixed and agitated at ambient temperature and pressure. The mixture slowly thickens and then expands to 3 to 4 times its original volume, then solidifies into a cellular solid product.

Other substituted organic compounds may be used in place of ethylene dichloride and benzyl chloride, such as ethylene dichloride, propylene dichloride, propylene dibromide, dihalides of unsaturated hydrocarbon gases derived from pressure-cracking processes or natural gas-cracking processes, polyhalide alkanes such as 1,1,2-trichloroethane; 1,2,4-trichlorobutane; trichloromesitylene; compounds containing disubstituted halogens, acid sulfates, intrates, acid phosphates, bicarbonates, formates, acetates, propionates, laurate, oleate, stearate, oxalate, acid malonate, acid tartrate, acid citrate, and mixtures thereof such as AA'disubstitutedethyl ether, BB'-disubstituted ethyl ether, disubstituted methyl ether, disubstituted ethoxy ethyl ether, disubstituted thio ethyl ether, disubstituted 1,3-methoxy-2,3-dimethyl propane, disubstituted dipropyl formal, disubstituted paradiethoxy benzene, disubstituted dimethoxy ethane, disubstituted diethyl carbonate, disubstituted glycol diacetate, pp'disubstituted dibenzyl ether, pp'disubstituted diphenyl ether, disubstituted diethyl sulphone, AA'disubstituted propyl ether, para-disubstituted benzene, disubstituted para-xylene, pp'disubstituted dibenzyl, disubstituted para hexyl propyl benzene, disubstituted 3-toyl propene-2, and mixtures thereof.

EXAMPLE 9

10 parts by weight of poly(vinyl acetate) polymer in an aqueous emulsion, 30 parts by weight of an aqueous sodium silicate solution containing about 40% sodium silicate ($SiO_2:NaO_2$ ratio of 2.75:1), 2 parts by weight of an aqueous solution containing 35% sodium peroxide, 0.5 part by weight of an alkyl phenoxy polyethoxy ethanol ("Triton X 100" by Rohm) and 0.25 part by weight of a polyether siloxane foam regulator ("Dow 193" surfactant) are thoroughly mixed in a container. The mixture slowly thickens over 10-to-30 minute period, then slowly expands to about 4 times its original volume, then solidifies into a rigid cellular solid product. The cellular product is air-dried. The light-weight cellular product does not support a flame on being heated with a propane torch.

EXAMPLE 10

Example 2 is modified by using other alkali metal silicates in place of sodium silicate, such as potassium silicate and lithium silicate to produce cellular products.

EXAMPLE 11

2 parts by weight of cellulose acetate, 30 parts by weight of white Portland cement, 15 parts by weight of water, 1.5 part by weight of an aqueous solution containing 35% by weight of hydrogen peroxide and 0.3 part by weight of a polyether siloxane foam regulator are added to a container, then thoroughly mixed. In a few minutes, the mixture begins to expand and then slowly solidifies in about 1 hour to produce a rigid cellular solid product. The foam cures into a strong, light-weight product.

EXAMPLE 12

Example 11 is modified by adding 5 parts by weight of powdered calcium silicate, 3 parts by weight of trichlorofluoromethane, and 1 part by weight of lignin to the components. A strong rigid cellular solid is produced.

EXAMPLE 13

Example 1 is modified by adding 5 parts by weight of a modifying compound selected from the group listed below and added with the other components:
(a) sodium polysulfate;
(b) aminoplast;
(c) phenoplast;
(d) furfural-ketone resin;
(e) wood flour.,
(f) wood fibers;
(g) cellulose;
(h) lignin;
(i) polyester resin;
(j) melimine;
(k) styrene;
(l) phenol-formaldehyde resin with free OH groups and neutralized with sodium silicate;
(m) sodium salt of poly(acrylic acid);
(n) sodium salt of poly(methacrylic acid);
(o) methyl methacrylate;
(p) vinyl acetate;
(q) polyepoxy resin;
(r) acrylonitrite.

EXAMPLE 14

2 parts by weight of ethyl acetate, 3 parts by weight of powdered sodium silicate ($NaO_2:SiO_3=3.2:1$), 30 parts by weight of Portland cement, 0.5 part by weight of an aqueous solution containing 35% hydrogen peroxide and 4 parts by weight of water are mixed. The mixture expands to 3 to 5 times its original volume, then in about 1 hour, hardens into a rigid cellular product.

Although specific conditions and ingredients have been described in conjunction with the above examples of preferred embodiments, these may be varied and other reagents and additives may be used, where suitable, as described above, with similar results.

Other modifications and applications of this invention will occur to those skilled in the art upon reading this disclosure. These are intended to be included within the scope of this invention as defined in the appended claims.

I claim:

1. The process for the production of foamed organic silicate products which consist of mixing and reacting the following components:
  A. a substituted organic compound having the graphical skeleton carbon structure of

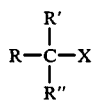

wherein X represents the substituents which split off during the reaction; the R, R' and R" are selected from the following groups: hydrogen, saturated straight-chain carbon atoms, unsaturated carbon atoms, ether linkages, ester linkages, aromatic structures, another X and mixtures thereof; the X substituents are selected from the following group, halogens, acid sulfate, nitrate, acid phosphate, bicarbonate, sulfate, formate, acetate, propionate, laurate, oleate, stearate, acid oxalate, acid malonate, acid tartrate, acid citrate and mixtures thereof, or wherein the substituted organic compound is a polysubstituted organic compound having the graphical skeleton carbonstructure of

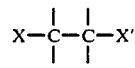

where

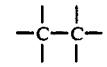

represents two adjacent carbon atoms or

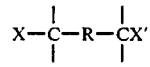

where X and X' represent the substituents which split off during the reaction and are selected from the group consisting of halogen, acid sulfate, nitrate, acid phosphate, bicarbonate, formate, acetate, propionate, laurate, oleate, stearate, oxalate, acid malonate, acid tartrate, acid citrate and mixtures thereof; the R between the pair of reactive carbon atoms is selected from the following groups, saturated straight-chain carbon atoms, unsaturated carbon atoms, ether linkage, ester linkages, aromatic structures and mixtures thereof, in the amount of 1 to 100 parts by weight;
  B. alkali oxidated silicon compound, in the amount of 100 parts by weight;
  C. free-radical initiator in the amount of 0.1 to 10 parts by weight,
  D. a blowing agent.

2. The process of claim 1 wherein the alkali oxidated silicon compound is selected from the group consisting of alkali metal silicates, alkaline earth metal silicates, water-binding silicate compounds containing an alkaline earth metal radical and mixtures thereof.

3. The process of claim 1 wherein the free-radical initiator is selected from the group consisting of organic peroxide, inorganic peroxide, alkali metal persulfates and mixtures thereof.

4. The process of claim 1 wherein up to 300% by weight of water, based on weight of Components A, B and C, is added to the components.

5. The process of claim 1 wherein up to 20% by weight of a foam stabilizer, based on weight of Components A, B and C of claim 1, is added to the components.

6. The process of claim 1 wherein up to 10% by weight of an emulsifier, based on weight of Components A, B and C of claim 1, is added to the components.

7. The process of claim 1 wherein up to 50% by weight of a chemically inert blowing agent, boiling within the range of −25° C. to 80° C., based on weight of Components A, B and C of claim 1, is added to the components.

8. The process of claim 1, wherein up to 300% by weight of inert filler material, based on weight of Components A, B and C of claim 1, is added to the components.

9. The process of claim 1 wherein up to 300% by weight of a modifying compound, based on the weight of Components A, B and C of claim 1, is added to the components.

10. The process of claim 1 wherein the substituted organic compound is selected from the group consisting of AA′disubstituted ethyl ether; BB′disubstituted ethyl ether; disubstituted methyl ether; disubstituted ethoxy ethyl ether; disubstituted thio ehtyl ether; disubstituted 1,3-methoxy 2,2-dimethyl propane; disubstituted dipropyl formal; disubstituted diethyl formal; disubstituted para diethoxy benzene; disubstituted dimethoxy ethane; disubstituted diethyl carbonate; disubstituted glycol diacetate; pp′-disubstituted diphenyl ether; disubstituted dibenzyl ehter; disubstituted diethyl sulphone; AA′-disubstituted propyl ether; para disubstituted benzene; disubstituted para xylene; pp′disubstituted dibenzyl; disubstituted para hexyl propyl benzene; disubstituted 3-tolyl propene-2;ethyl dichloride; ehtylene dibromide;-propylene dichloride; propylene dibromide; dihalides of unsaturated hdyrocarbon gases derived from pressure-cracking processes and material gas-cracking processes; 1,1,2-trichloroethane; 1,2,4-trichlorobutane; trichloromesitylene; cellulose acetate; polyvinyl acetate emulsion; nitrocellulose; cellulose acetate butyrate; cellulose propionate; cellulose acetate phthalates; and mixtures thereof.

* * * * *